Figure 1:
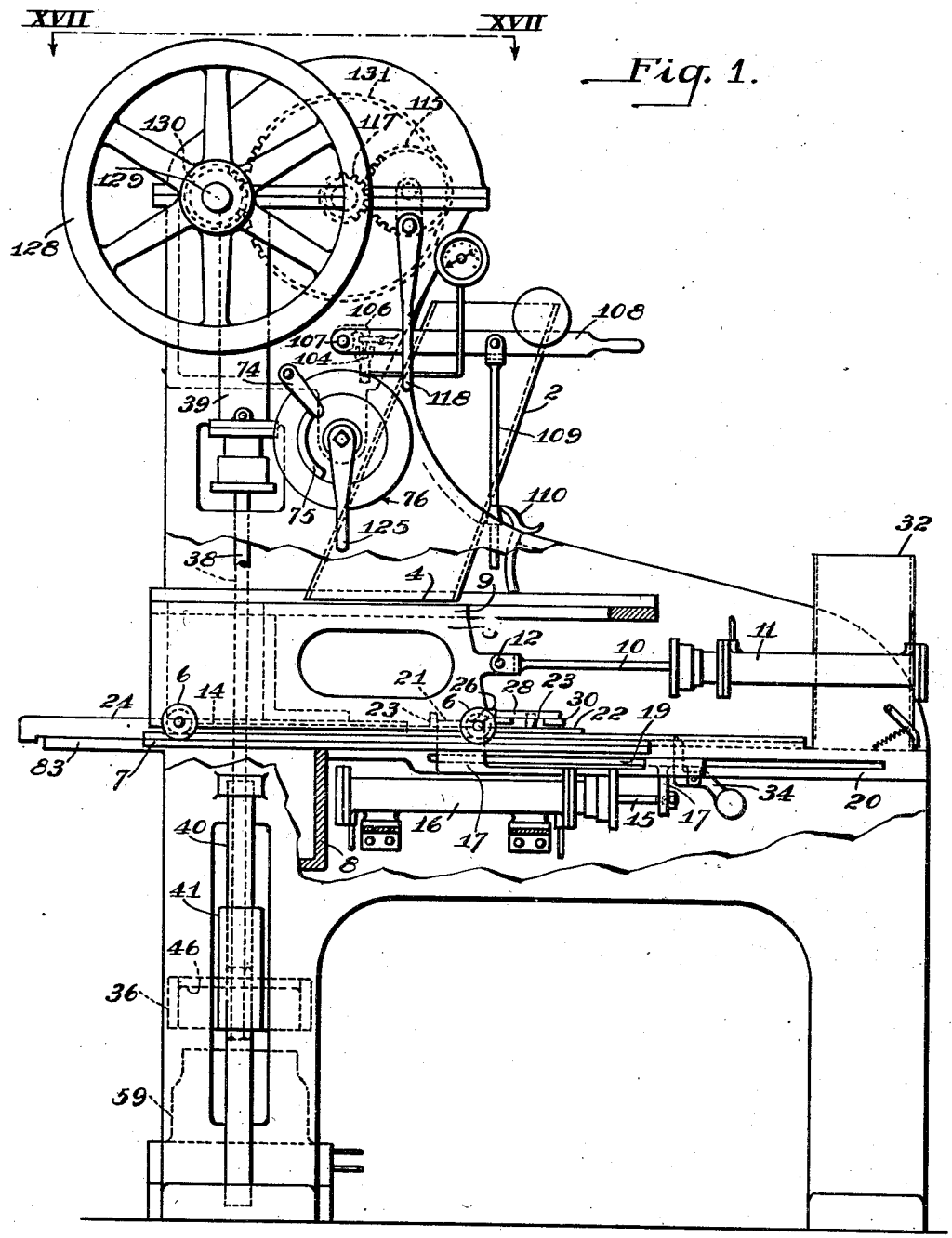

Aug. 29, 1933. K. E. W. JAGDMANN ET AL 1,925,050
MOLDING MACHINE AND METHOD OF OPERATING THE SAME
Filed June 19, 1928 16 Sheets-Sheet 1

INVENTOR
Karl Eric Wilhelm Jagdmann
Oscar Henry Bowler
by Byrnes, Stebbins & Parmelee
their attorneys

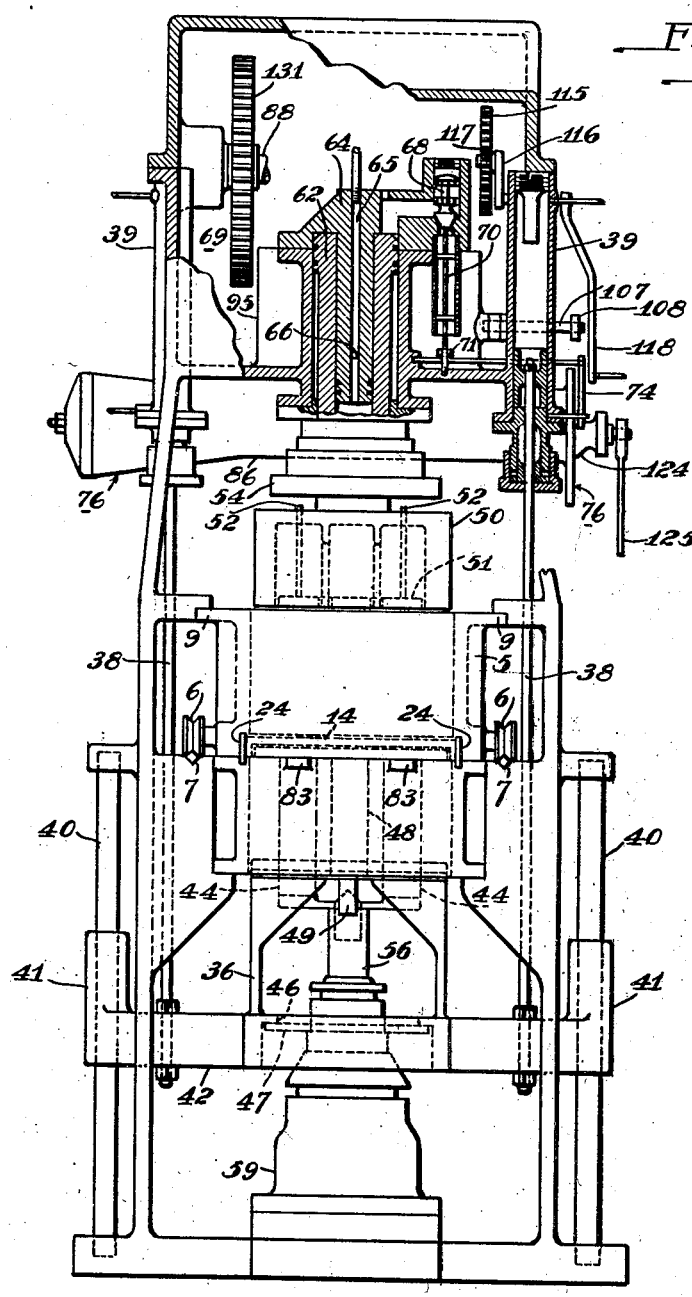

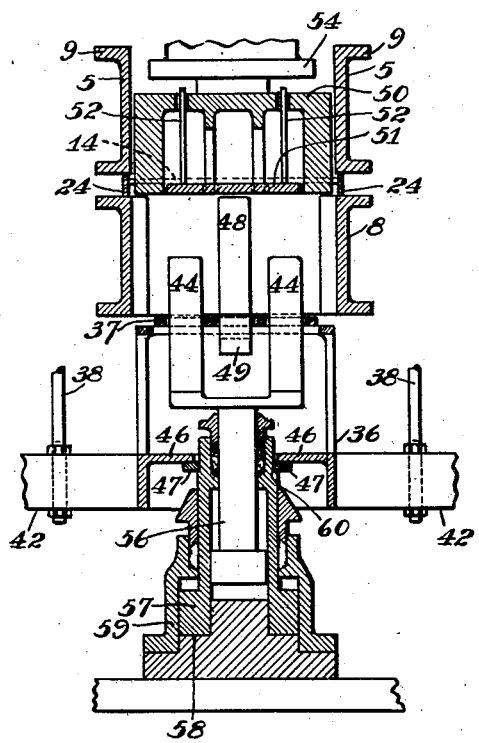
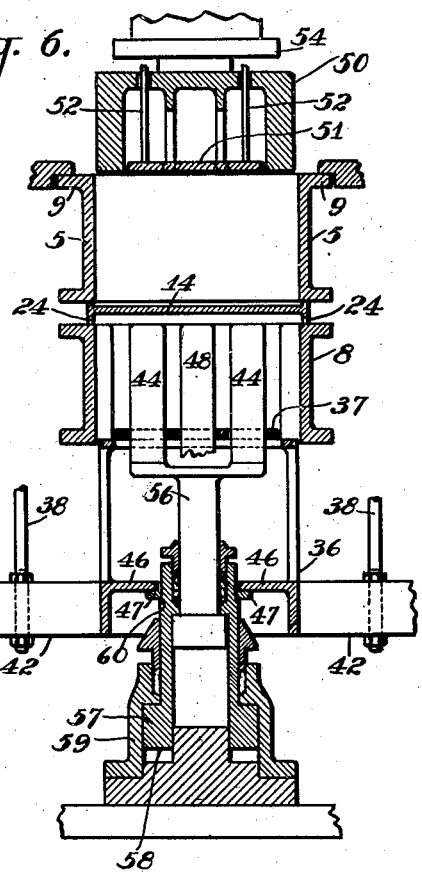
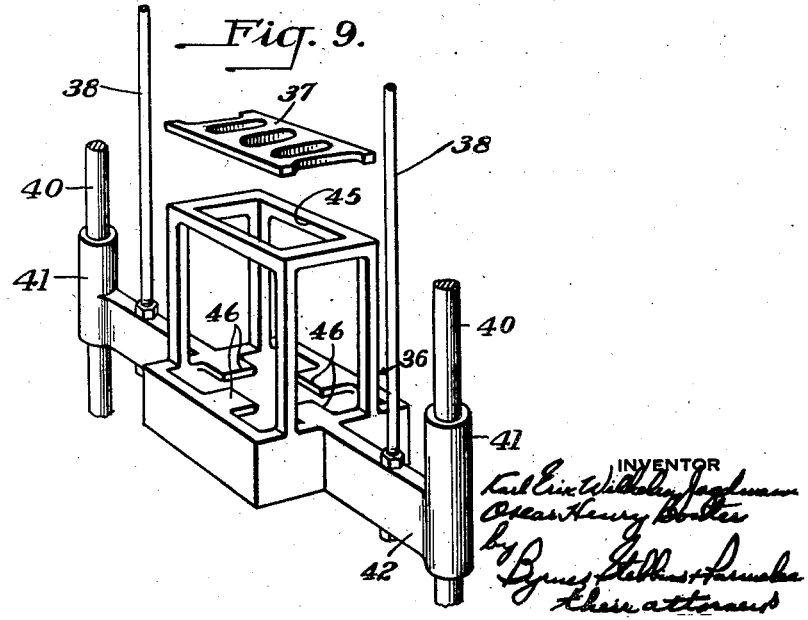

Aug. 29, 1933.  K. E. W. JAGDMANN ET AL  1,925,050
MOLDING MACHINE AND METHOD OF OPERATING THE SAME
Filed June 19, 1928  16 Sheets-Sheet 6
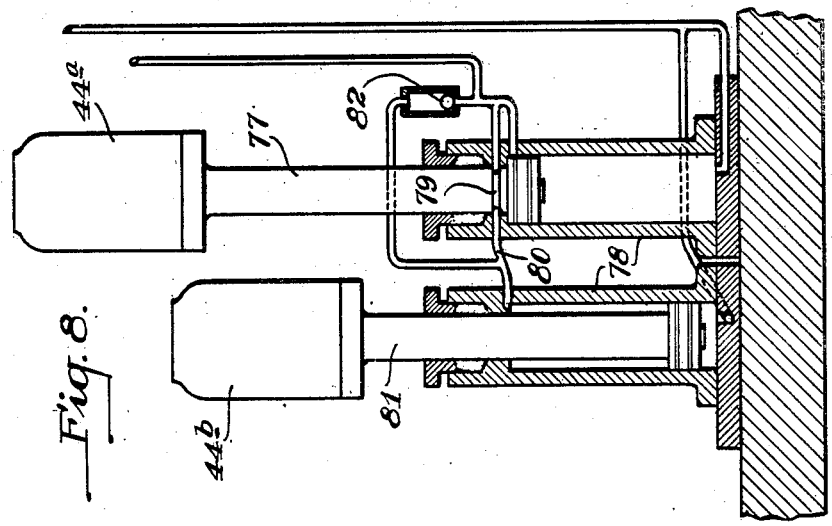
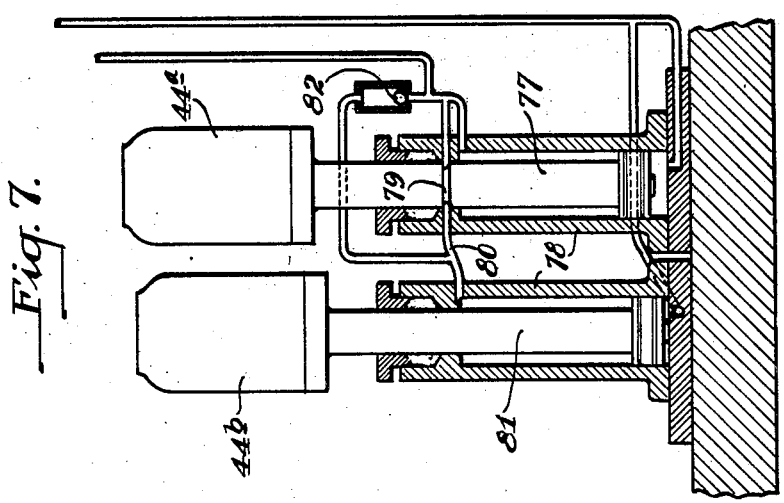

Aug. 29, 1933. K. E. W. JAGDMANN ET AL 1,925,050
MOLDING MACHINE AND METHOD OF OPERATING THE SAME
Filed June 19, 1928 16 Sheets-Sheet 7

INVENTOR

Aug. 29, 1933.   K. E. W. JAGDMANN ET AL   1,925,050
MOLDING MACHINE AND METHOD OF OPERATING THE SAME
Filed June 19, 1928   16 Sheets-Sheet 8

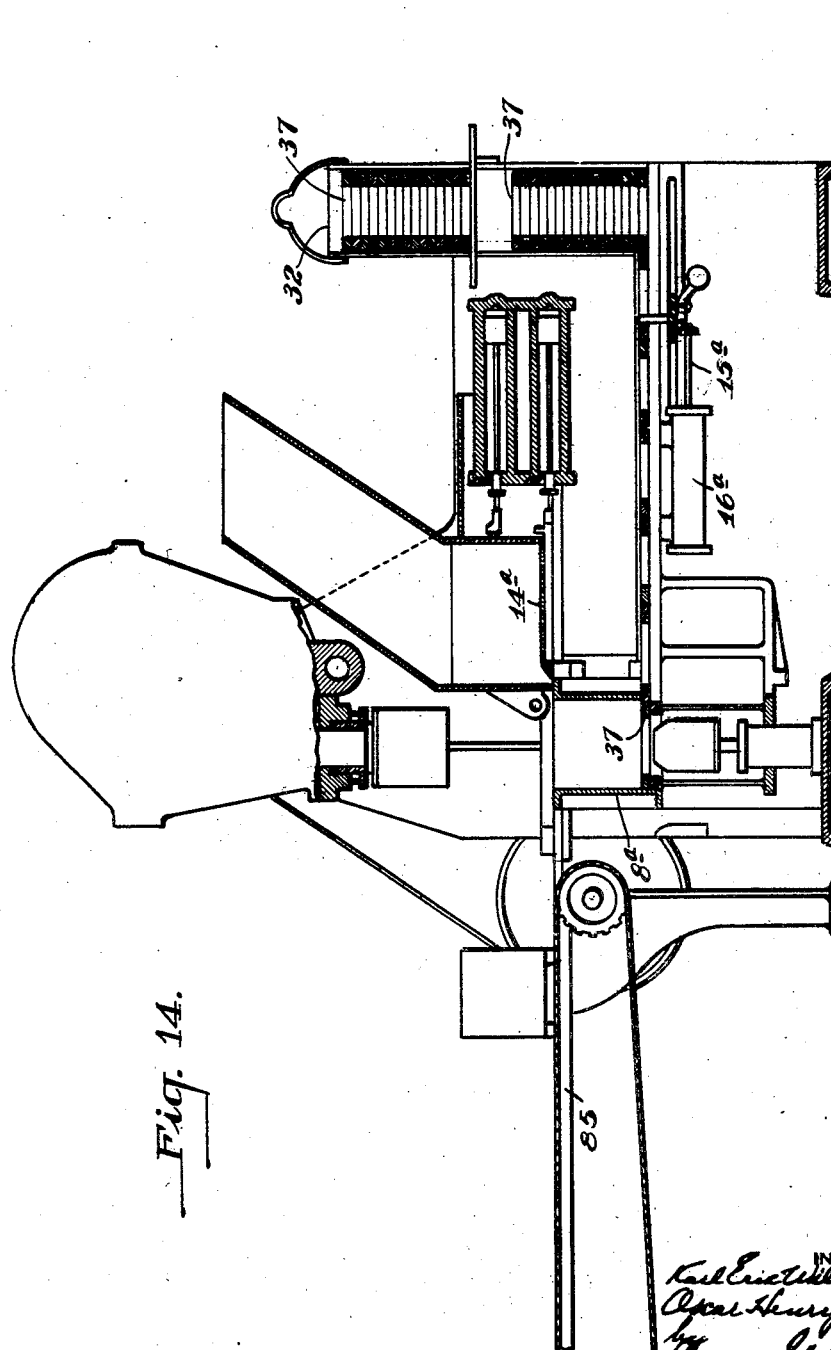

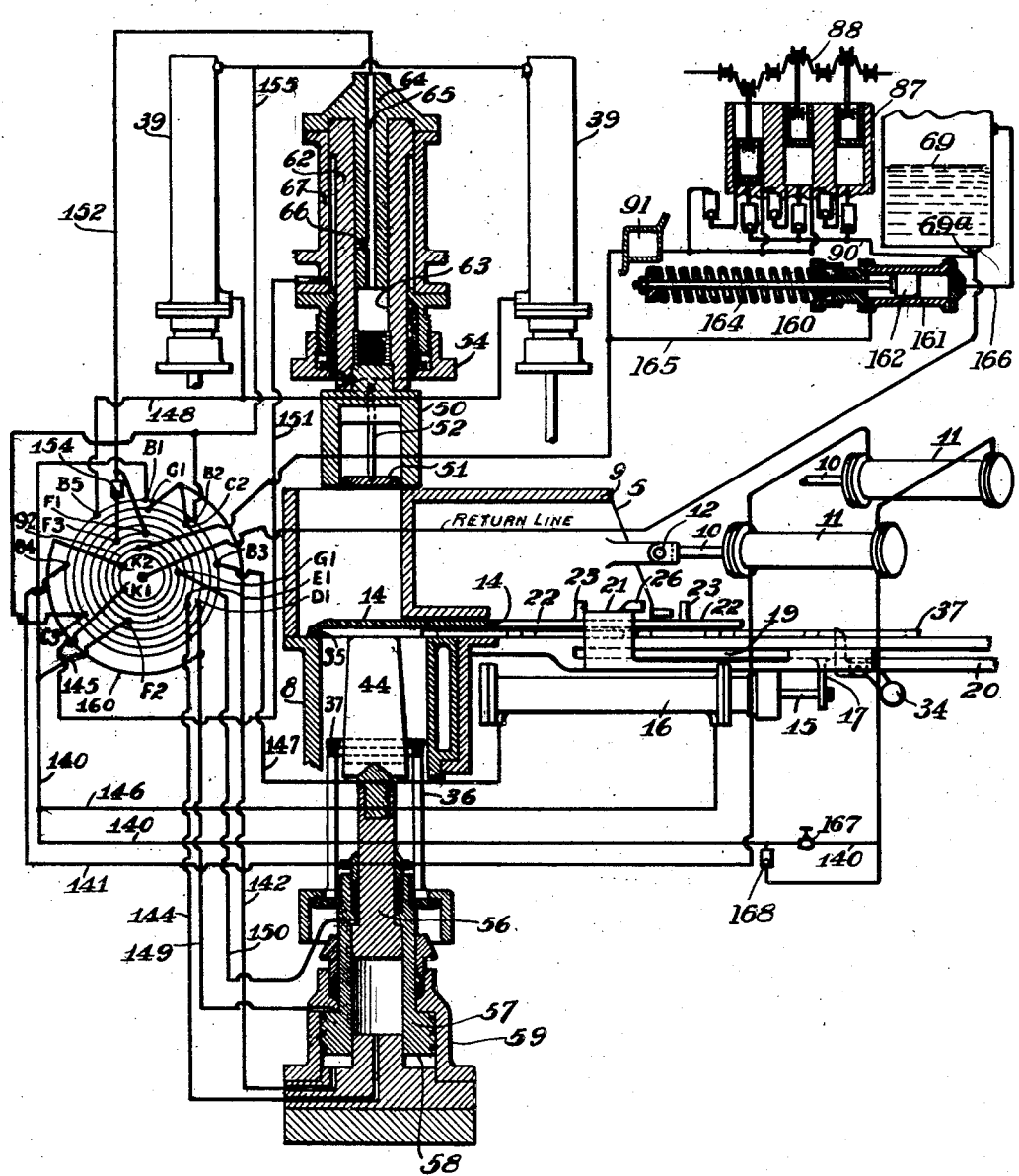

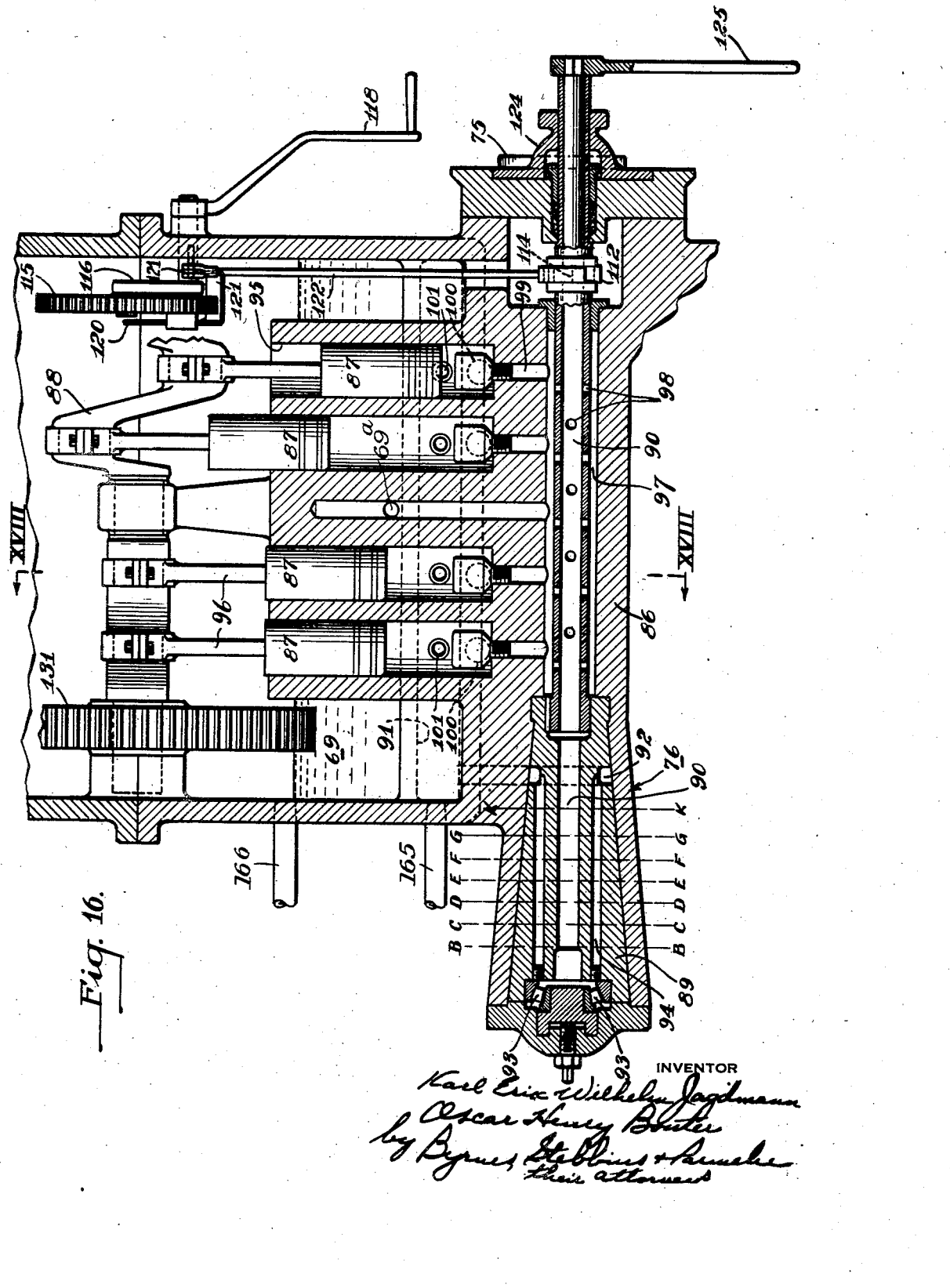

Aug. 29, 1933. K. E. W. JAGDMANN ET AL 1,925,050
MOLDING MACHINE AND METHOD OF OPERATING THE SAME
Filed June 19, 1928 16 Sheets-Sheet 12

Aug. 29, 1933.    K. E. W. JAGDMANN ET AL    1,925,050
MOLDING MACHINE AND METHOD OF OPERATING THE SAME
Filed June 19, 1928    16 Sheets-Sheet 13
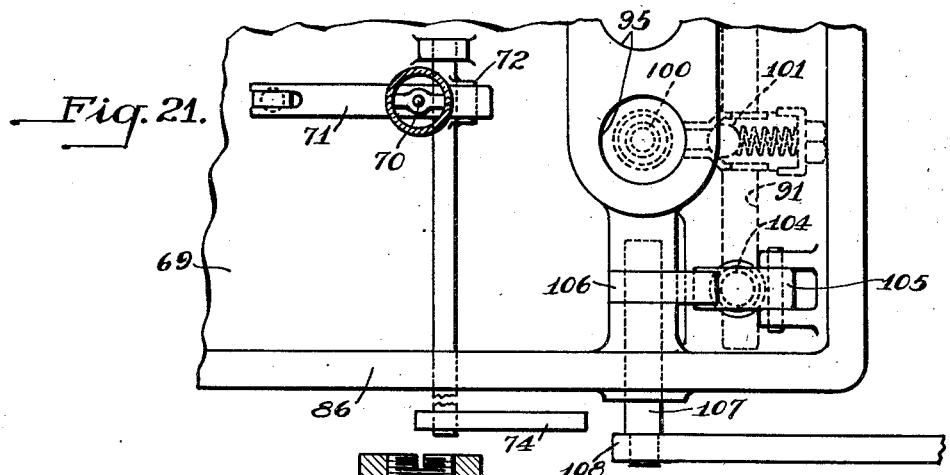
Fig. 21.
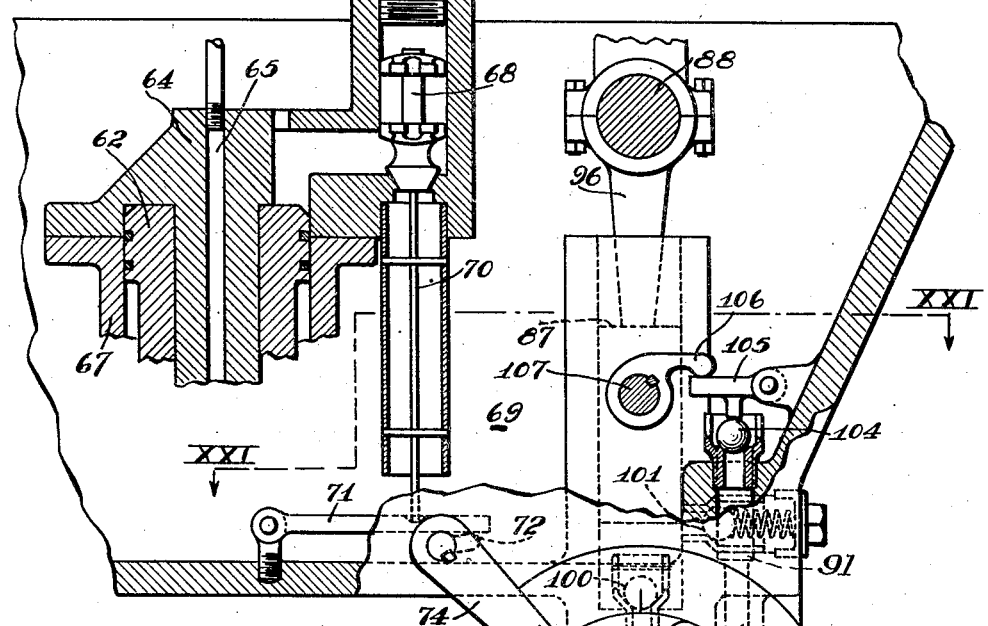
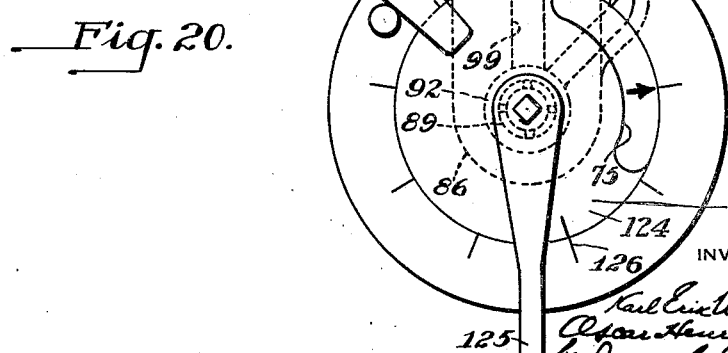
Fig. 20.
INVENTOR Aug. 29, 1933.    K. E. W. JAGDMANN ET AL    1,925,050
MOLDING MACHINE AND METHOD OF OPERATING THE SAME
Filed June 19, 1928    16 Sheets-Sheet 14

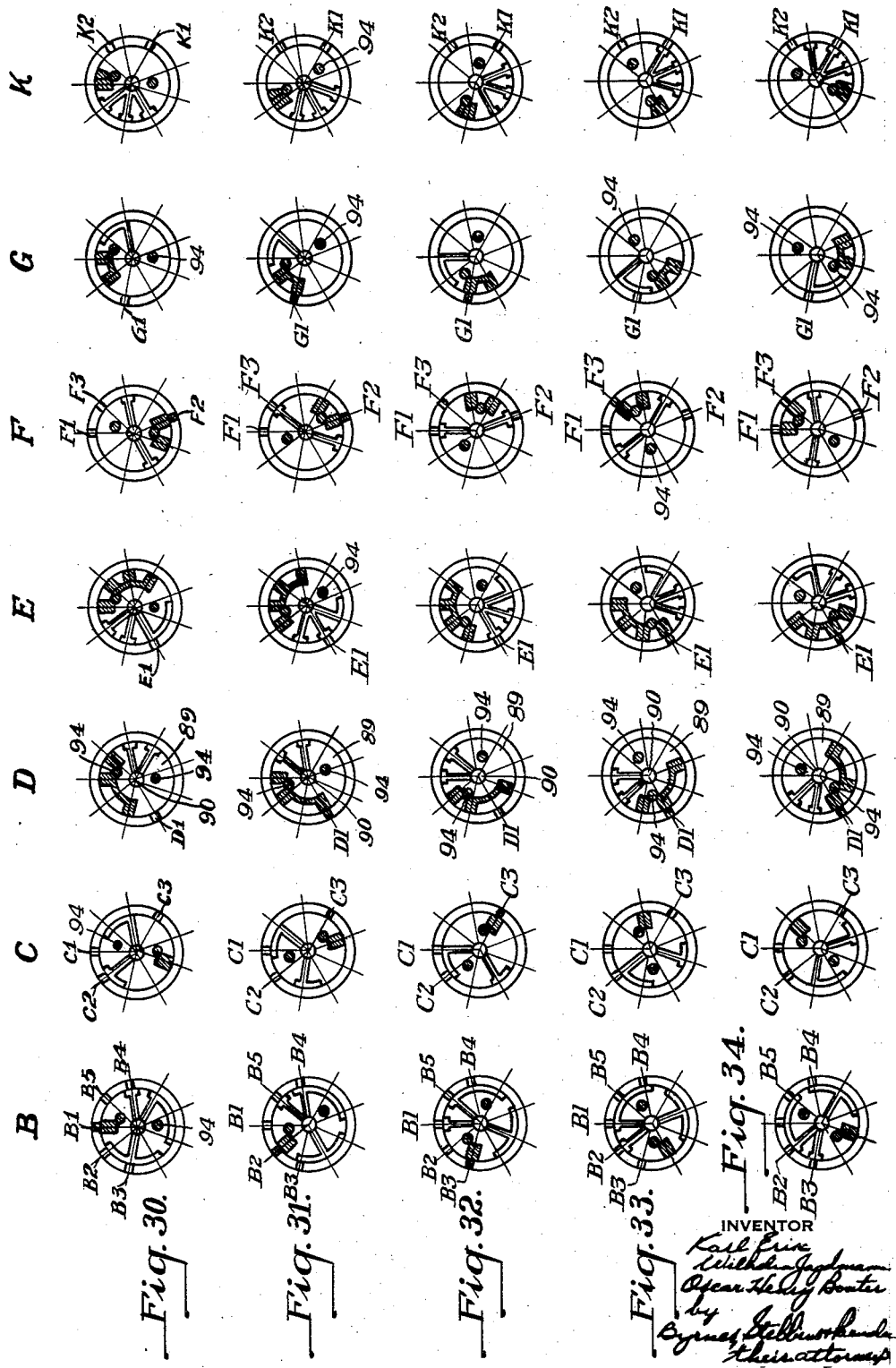

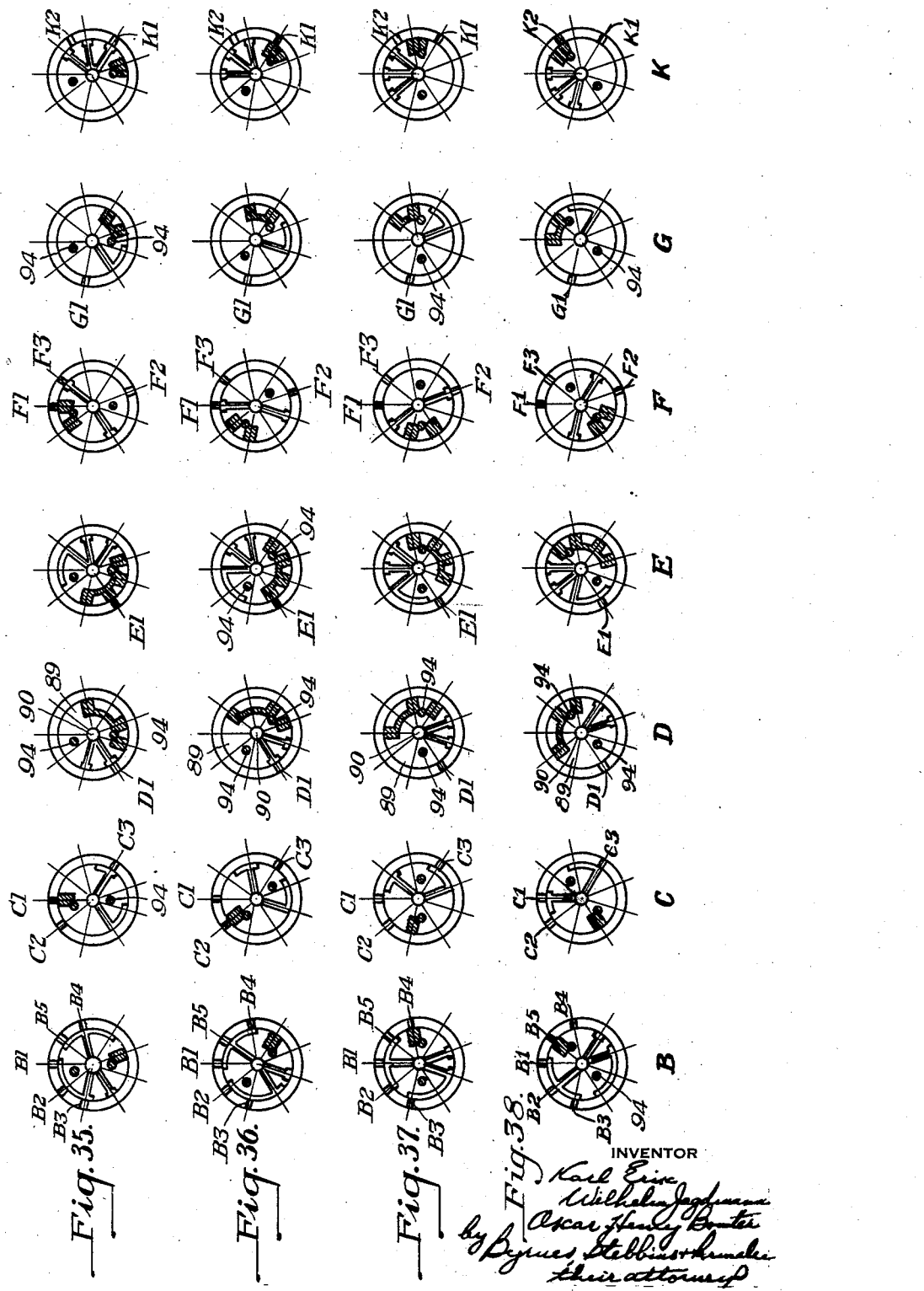

Patented Aug. 29, 1933

1,925,050

UNITED STATES PATENT OFFICE 1,925,050

MOLDING MACHINE AND METHOD OF OPERATING THE SAME

Karl Erik Wilhelm Jagdmann and Oscar Henry Bonter, Cambridge Springs, Pa., assignors to The Blystone Manufacturing Company, Cambridge Springs, Pa., a corporation of Pennsylvania Application June 19, 1928. Serial No. 286,610

21 Claims. (Cl. 25—84)

This invention relates to molding machines and methods of operating the same, and is particularly useful for the making of cored articles, although certain features of the machine have numerous other applications.

In the U. S. patent of David C. Goldston, No. 1,695,327, there is described and claimed a molding machine wherein pallets are successively fed to a mold box, and a hopper full of the material to be molded is charged thereto above the pallet. The material is pressed into the desired shape and the pallet with the pressed article thereon is delivered from the machine.

In using a machine of the character shown in the Goldston application, difficulty is sometimes encountered in distributing the material to be molded throughout the mold box in such manner that uniform density is obtained throughout the finished product.

This is particularly true in the manufacture of cored articles, such as cement blocks. We have found, when it is attempted to compact material in a mold of this character with the cores in place, that in relatively narrow and deep portions of the mold, such as are common with articles of this type, the material tends to bridge between the mold wall and the core and to resist tamping or compression to such an extent that the finished product is "honeycombed", and distinctly weaker in some parts than in the other parts of the product.

Another difficulty arising out of this condition is non-uniformity in the size of the finished blocks. The volume of the mold is of course constant and the hopper is arranged to supply material thereto before the application of the molding pressure. If this material incompletely fills the mold and is uniformly compacted, the blocks will vary in size.

We provide a mold and a relatively movable core for piercing material in the mold. Preferably the core is arranged to be substantially entirely withdrawn from the mold at the time that the material is supplied thereto and to be thereafter moved to its final position.

More specifically, we preferably employ a mold arranged to receive a pallet at its bottom having openings therethrough for the reception of cores from below, and cores which normally are withdrawn from the mold at the time of charging material, together with means for closing off the top of the mold, which means offers resistance to the material when the cores are driven upwardly to their final position and effects some degree of compression. We further provide means for positioning the cores sequentially in case a plurality of cores are used. This is found to be of value in producing uniformly dense products.

We have found that if one core is driven home in advance of an adjacent core, the tendency of the material to adhere to the core which is already in place is converted from a disadvantage, as in the old machines, to a positive advantage, as the tendency of the material to pack non-uniformly between the cores is eliminated or materially reduced. It is not necessary that all of the cores be driven through the material in the mold. For example, one core may be fixed and the material may be charged there-around, the compacting being effected by driving home an adjacent core. In either case, the core is driven through or into the material after that material has surrounded a core in its final position.

The adhesion of material to the first core is utilized in resisting non-uniform distribution of material during the movement of the second core. It will be appreciated that it will not be satisfactory to use a fixed core adjacent the side of a mold, as this would result in a porous structure between such core and the mold wall; but it is entirely feasible to position a stationary core at some distance from a mold wall and to provide a movable core between the mold wall and the fixed core.

The cores, when driven upwardly, tend to displace the material above them, and provision is made for removing this material from the mold. If this were not done and a non-yieldable means for applying pressure on top of the material were employed, there would be danger of breaking the machine, and the material above the cores would be very much more highly compressed than the remaining material in the article.

We provide means in the pressing device which cooperates with the core for permitting the escape of material confined between the end of the core and the pressing device. The pressing device is preferably so arranged that the material thus escaping from the mold is discharged after the pressing device has been separated from the mold. The material may be conveniently discharged into the material hopper to be used in the manufacture of a subsequent article.

Provision is made for applying full tamping pressure to the article after the cores have been driven home. Instead of applying the pressure solely from the top and holding the mold stationary, we provide for applying pressure to different sides of the article. As for example, by applying pressure on the top of the mold and also on the bottom of the pallet, the pallet forms a portion of the mold, and while under the tamping pressure is moved bodily. It is found with this arrangement that more uniformly dense articles are secured, as the bridging effect of the material is reduced or eliminated.

The various units of the machine are preferably operated by fluid pressure, and automatic valve means are provided for effecting their operation in the desired sequence.

Figure 2:
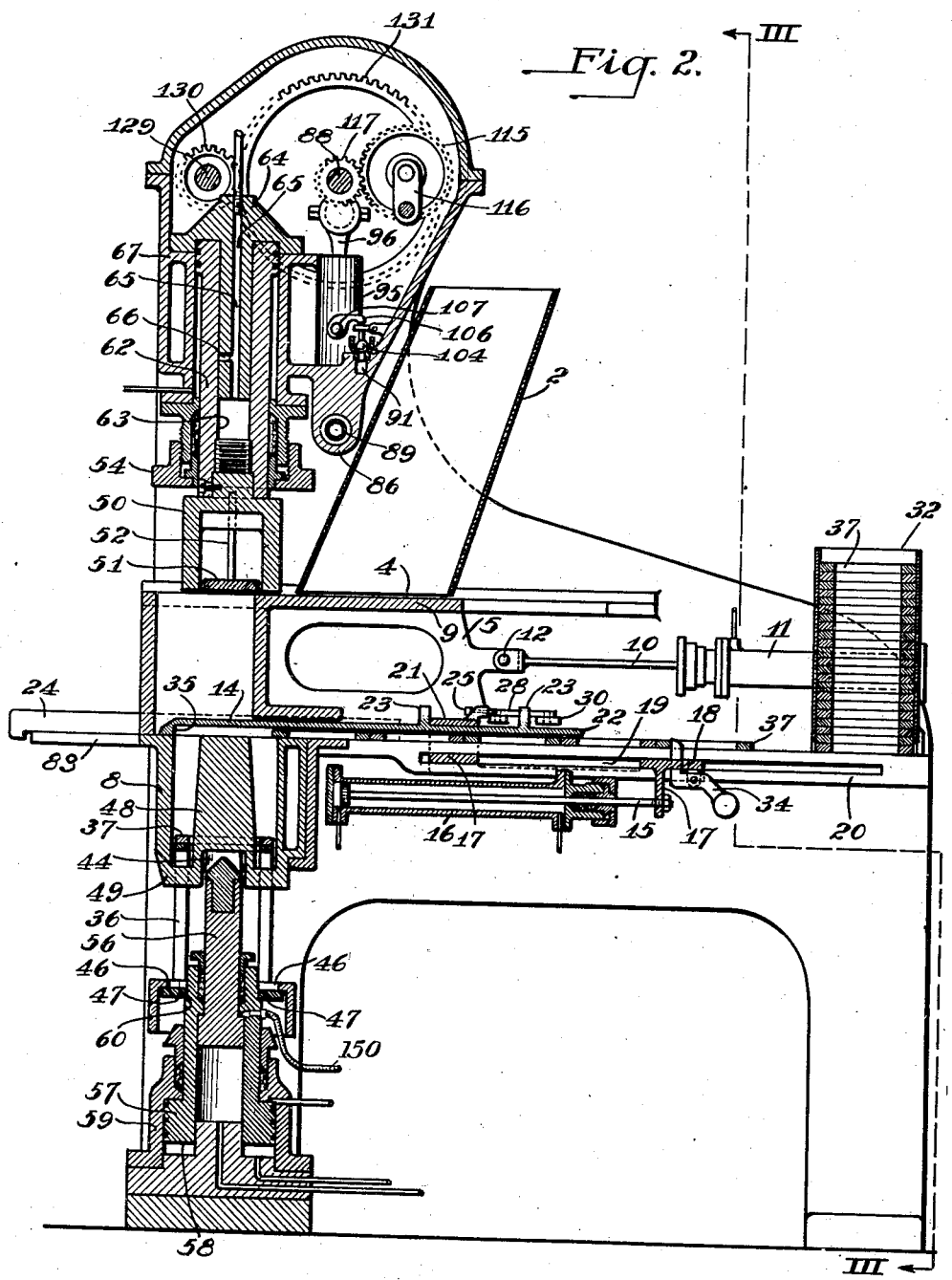
Figure 3:
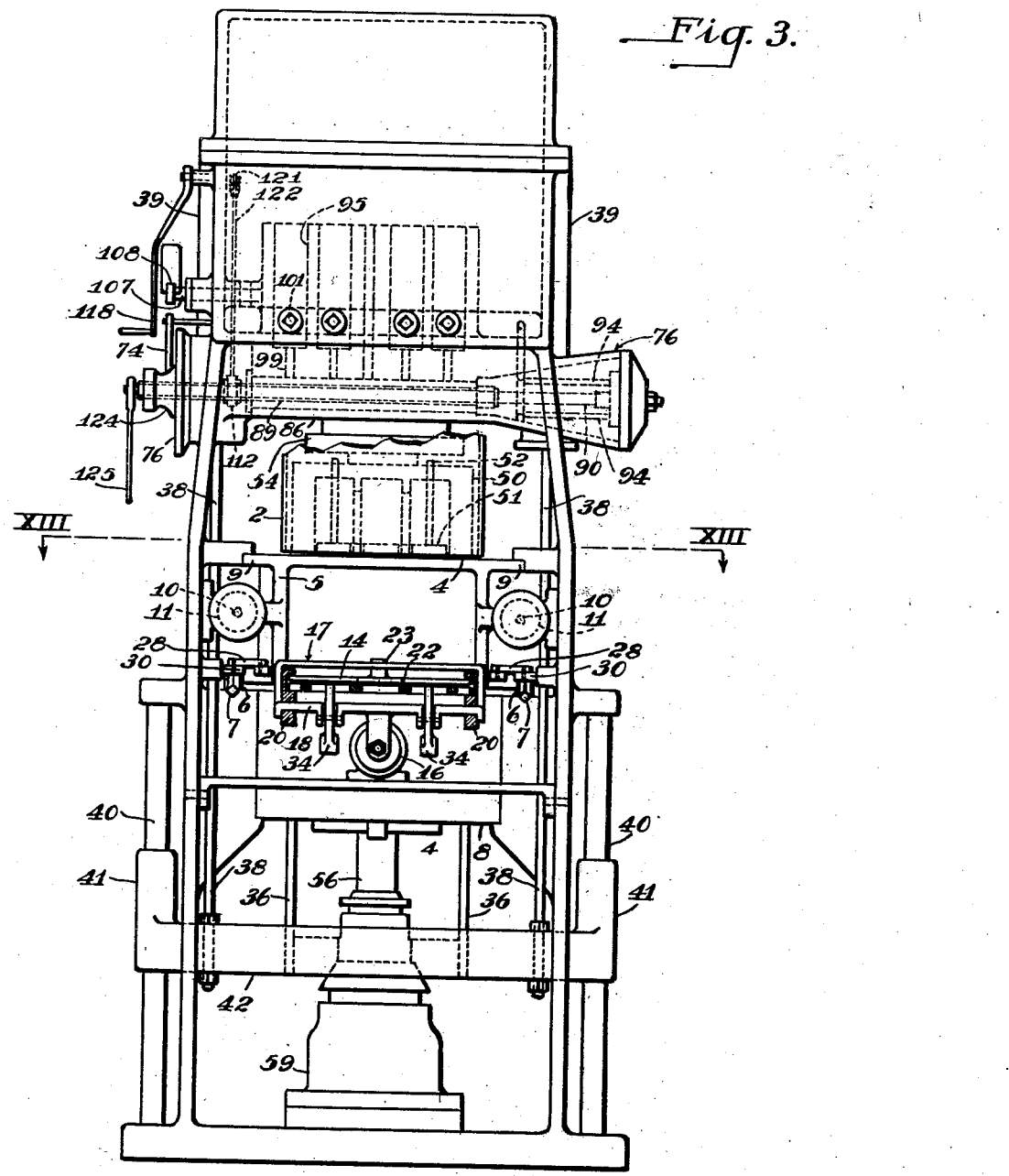
Figure 10:
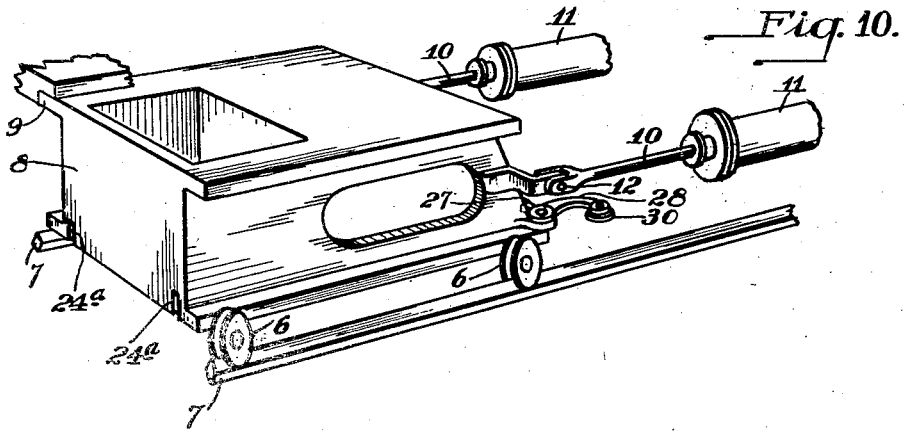
Figure 11:
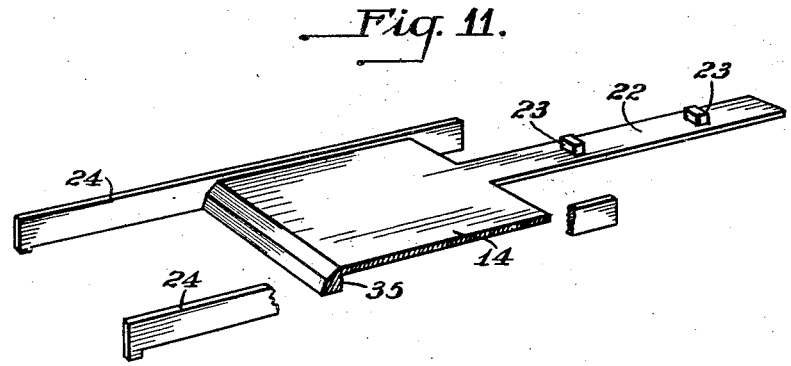
Figure 12:
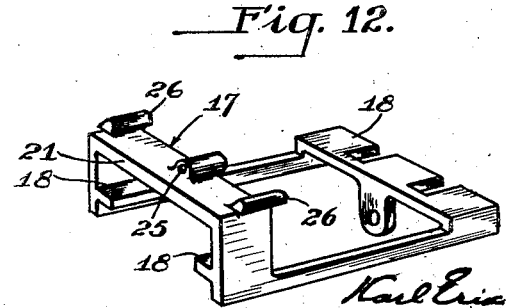
Figure 17:
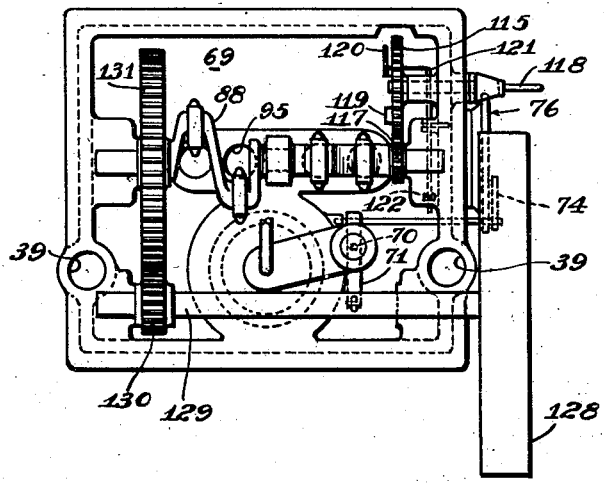
Figure 13:
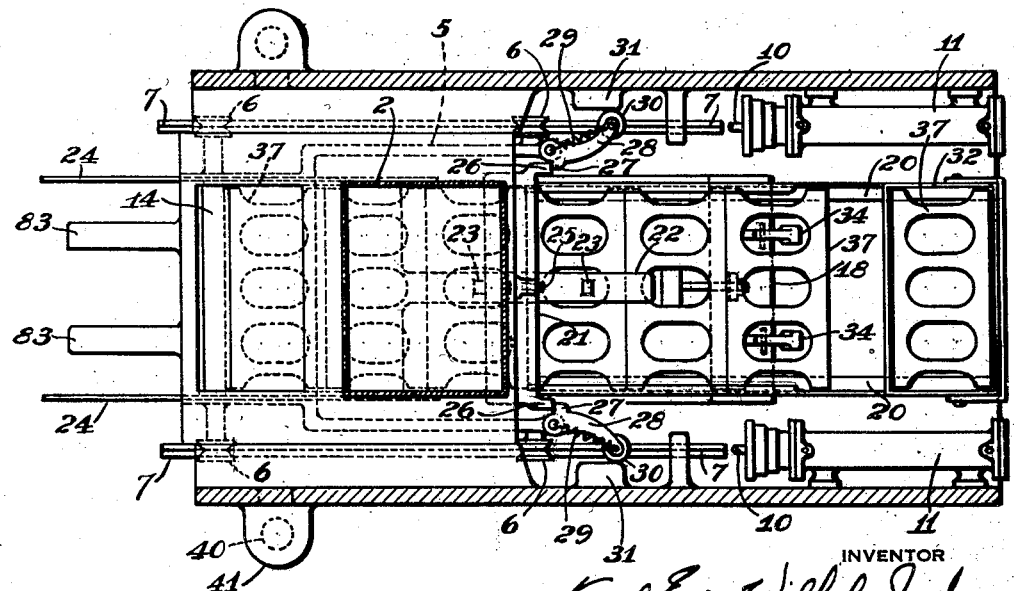
Figure 18:
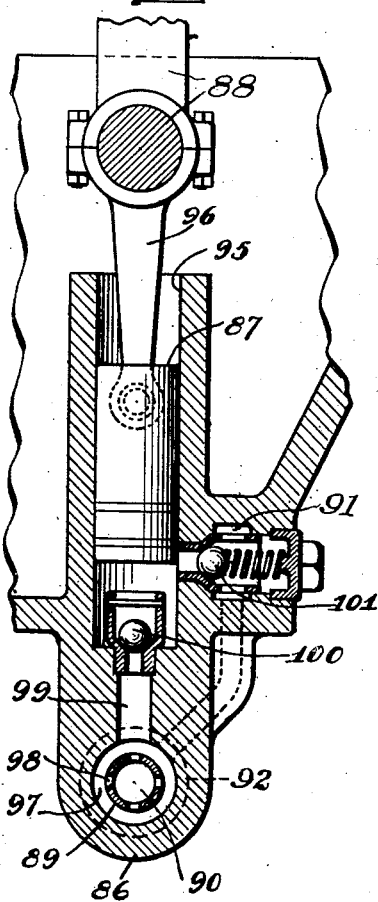
Figure 19:
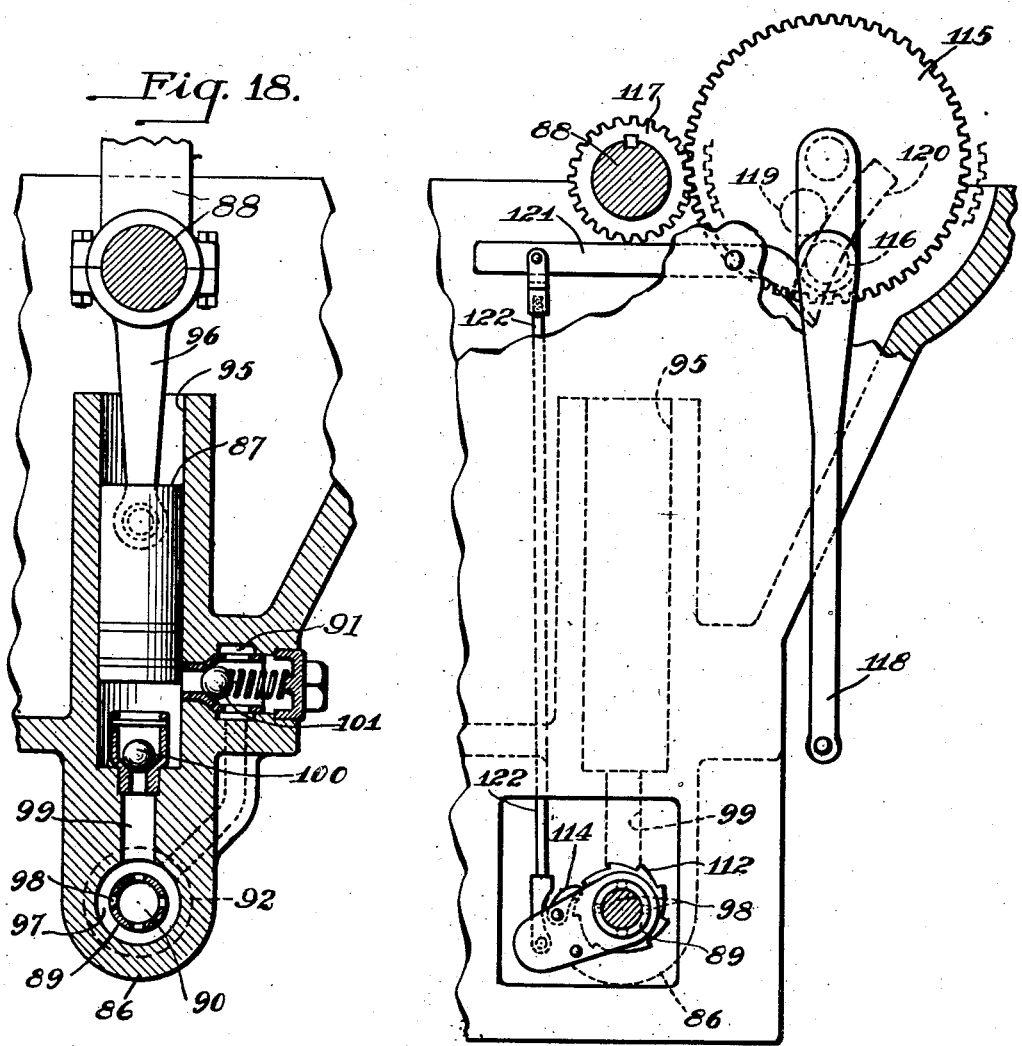
Figure 23:
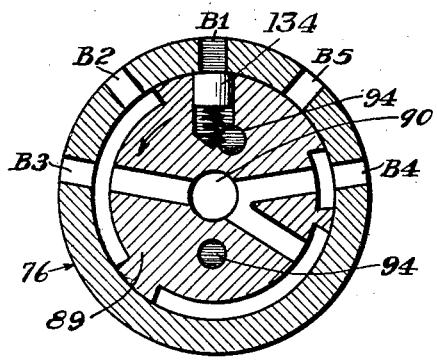
Figure 24:
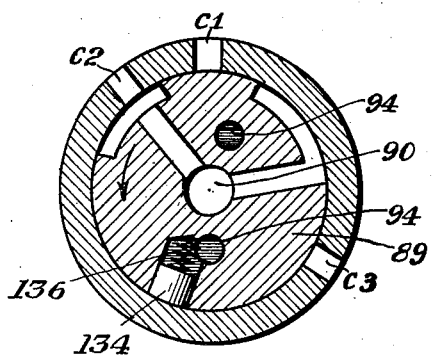
Figure 25:
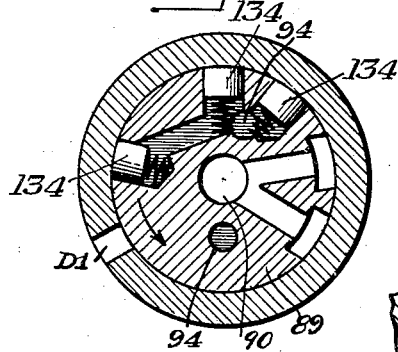
Figure 22:
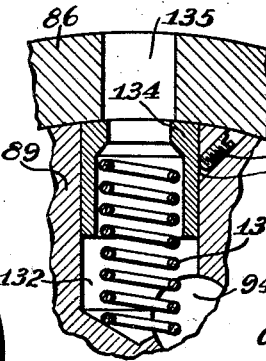
Figure 26:
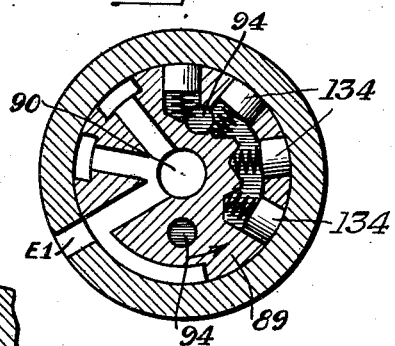
Figure 27:
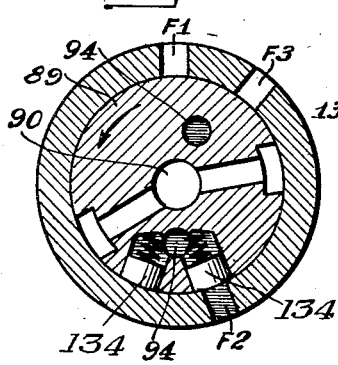
Figure 28:
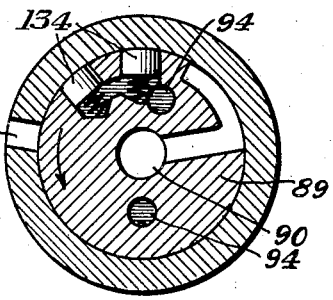
Figure 29:
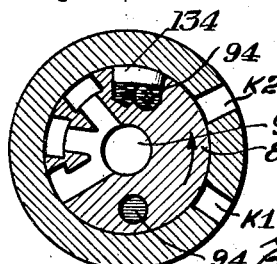

The accompanying drawings illustrate the present preferred embodiment of the invention, in which:

Figure 1 is a side view of the molding machine with portions of the frame broken away, Figure 2 is a longitudinal sectional view thereof, Figure 3 is an end view thereof taken along the section line III—III of Figure 2, with a part of the material chute broken away, Figure 4 is an end view of the machine, partially in elevation and partially in section, taken at the opposite end of the machine from that illustrated in Figure 3, Figure 5 is a sectional view of the mold and relatively movable cores, with the cores in a partially retracted position, Figure 6 is a similar view with the cores in their ultimate material-piercing position, Figures 7 and 8 are diagrammatical sectional views of a mechanism for moving a plurality of cores in sequence, showing the cores in their lower or retracted positions, and in their relative positions at the end of the movement of one of the cores, respectively, Figure 9 is a perspective view of the pallet supporting mechanism, Figure 10 is a perspective view of the material hopper, Figure 11 is a perspective view, partially in section, of the movable bottom of the hopper, Figure 12 is a perspective view of a portion of the pallet actuating mechanism, Figure 13 is a horizontal plan view of the machine taken substantially along the section lines XIII—XIII of Figure 3, Figure 14 is a sectional view of a modified form of the machine in which the pallets are fed into the bottom of the mold, Figure 15 is a diagrammatical view, partially in section illustrating the actuating cylinders of the machine and the system of control therefor, Figure 16 is a longitudinal sectional view of the control valve and mechanism for supplying fluid under pressure thereto, Figure 17 is a horizontal plan view of the fluid compressing mechanism and the actuating mechanism for the control valve, taken substantially along the section line XVII—XVII of Figure 1, Figure 18 is a sectional view of a pump unit for the fluid control system, taken substantially along the section line XVIII—XVIII of Figure 16, Figure 19 is an elevational view of the timing and actuating mechanism for the control valve, Figure 20 is an elevational view, partially in section, of the control valve, pressure relief mechanism, and mechanism for relieving the vacuum in one of the actuating cylinders, Figure 21 is a horizontal plan view thereof taken substantially along the section line XXI—XXI of Figure 20, Figure 22 is a sectional view of a sealing device for closing the joints in the control valve, Figure 23 is a cross sectional view of the control valve, taken along the section line BB of Figure 16, Figure 24 is a sectional view of the control valve taken along the section line CC of Figure 16, Figure 25 is a sectional view of the control valve taken along the section line DD of Figure 16, Figure 26 is a sectional view of the control valve taken along the section line EE of Figure 16, Figure 27 is a sectional view of the control valve taken along the section line FF of Figure 16, Figure 28 is a sectional view of the control valve taken along the section line GG of Figure 16, Figure 29 is a sectional view of the control valve taken along the section line KK of Figure 16, Figure 30 is a diagrammatic view illustrating the relative positions of the valve sections shown in Figures 23 to 29 inclusive, in the first position of the control valve, Figures 31, 32, 33, 34, 35, 36, 37 and 38 are views similar to Figure 30, illustrating the successive relative positions occupied by the sections of the control valve during a complete operating cycle of the molding machine.

In the illustrated embodiment of the invention there is shown and included a chute 2, adapted to be connected with any suitable hopper or other source of material to be compressed into blocks, terminating in a substantially horizontal bottom outlet 4. The outlet 4 is positioned immediately above a feed box or hopper 5 shown in Figures 1, 4 and 10. The feed box or hopper 5 is supported by rollers 6 on tracks 7 for reciprocation between a position, shown in Figure 2, immediately above a mold chamber 8 in which the block is to be compressed, and a retracted position for receiving the material from the chute 2.

The feed box 5 is filled with material from the chute 2, so that as it moves into position above the mold chamber, it carries a definite quantity of material to be compressed. The feed box is provided with an integral extension 9 which serves to close the opening 4 when the feed box is in its forward position.

Reciprocation of the feed box 5 is effected by pistons 10, working in oil cylinders 11 and connected to the feed box 5 by a pin connection 12 which allows sufficient flexibility to take care of misalignment caused by construction or operation and serves to allow freedom of operation at all times, as shown in Figures 1, 2 and 10.

The feed box 5, when in its forward position, is emptied into the mold 8 by a slidable bottom 14, actuated by a piston 15 working in an oil cylinder 16 through a connecting saddle 17. As shown in Figure 12, the saddle 17 is confined to movement in substantially a horizontal plane by guide blocks 18, working in grooves 19 formed on the outer surfaces of horizontally extending supporting beams 20. For transmitting movement from the saddle 17 to the bottom 14, a cross piece 21 of the saddle 17 is seated on a tail piece 22 of the bottom 14 between upwardly projecting lugs 23. The bottom 14 is guided by side bars 24 seated in slots 24a at the bottom of the feed box 5. As shown in Figures 12 and 15, the limiting positions of the bottom 14 relative to the frame of the molding machine are determined by adjusting a set screw 25 mounted on the cross piece 21 and engaging one of the lugs 23.

For reasons hereinafter more fully described in connection with the positioning of pallets in the mold 8, it is desirable to have the feed box 5 and bottom 14 overtravel the mold 8, and to slightly withdraw the box 5 before it is emptied by movement of the bottom 14. Such movement of the feed box 5 during a portion of the rearward movement of the bottom 14 is secured by providing lugs 26 on the cross piece 21 for engaging lugs 27 carried by latches 28, mounted on the feed box 5, as shown in Figures 10 and 13. The latches 28 are biased outwardly by springs 29 to press rollers 30 against blocks 31 mounted in the machine frame. As the bottom 14 is moved toward the rear of the machine, the lugs 26 engage the lugs 27 and draw the feed box 5 along with the bottom 14 so long as the rollers 30 engage the blocks 31. The feed box 5 is released from the bottom 14 as soon as the rollers 30 pass beyond the end of the blocks 31 by contraction of the springs 29. Since the bottom 14 is withdrawn to release the material from the feed box 5 before the feed box 5 is moved to the rear of the machine for refilling, the lugs 26 re-engage the lugs 27 upon the complete withdrawal of the feed box 5 to the rear of the machine and before the next forward movement of the feed box 5 and bottom 14 for supplying material to the mold 8.

As shown in Figures 1 and 2, pallets are supplied to the mold 8 from a hopper 32 in accordance with movement of the bottom 14. The pallets are moved from the hopper 32 by a pair of weighted dogs 34 carried by the saddle 17. As the saddle 17 is moved rearwardly along the beams 20, the dogs 34 slide under the forward edge of the lowest pallet in the hopper 32. When the saddle 17 is again moved forwardly, the pallet in engagement with the dogs 34 is moved along the top of the beams 20. The forward pallet on the beams 20 is seated in a notch 35 beneath the forward edge of the bottom 14 and is positioned above the mold 8 simultaneously with the forward movement of the feed box 5.

In order to insure the exact positioning of the pallets in the mold 8, the forward edges of the feed box 5 and bottom 14 are initially moved slightly beyond or overtravel the forward edge of the mold 8. After the pallet is placed in the mold, and lowered out of engagement with the notch 35 into its permanent position, the bottom 14 is moved rearwardly by actuation of the piston 15. The initial rearward movement of the bottom 14 carries the feed box 5 along with it while the engagement between the lugs 26 and latches 28 continues. After the bottom 14 and feed box 5 become disengaged, the bottom is further retracted and the material deposited into the mold 8.

The pallets are received in the mold 8 when a pallet supporting frame 36, shown in Figure 9, is in a raised position from which the last molded object was discharged by the forward movement of the filled feed box 5. After the new pallet 37 is brought to rest on the frame 36, the frame is lowered by pistons 38 working in oil cylinders 39. The frame 36 is secured against rotational movement relative to the mold 8 by guide rods 40 carried by the machine frame and extending through sleeves 41 mounted on the outer ends of extensions 42 on the frame 36.

Referring to Figure 14, the pallets 37 may be fed directly into the bottom of a mold 8a, by providing an additional piston 15a and cylinder 16a for actuating the pallet feeding mechanism separately from the movement of a feed box bottom 14a.

For permitting movement of cores 44 relatively to the pallet frame 36, the latter is provided with a substantially rectangular opening 45 along its upper face and inwardly projecting lugs 46 at its base. Lugs 46 bear upon a collar 47 carried by the actuating mechanism for the cores 44.

The material in the feed box 5 is discharged into the mold 8 after the pallet 37 is lowered to the bottom of the mold 8 by actuation of the pistons 38. If the spaces between adjacent cores, and/or between the cores and the walls of the mold are too narrow, the material adheres to the exposed surfaces and does not completely fill the spaces or passages. Where such small passages are not completely filled with material during the filling of the mold, the molded objects are either of non-uniform density or of different sizes, due to the incomplete filling of the spaces, or, where the space is completely filled during the molding operation, to the lack of sufficient material in the mold. To obtain uniform distribution of the material in the mold 8, by preventing "honeycombing" of the material in the mold due to a bridging action across narrow spaces between cores, we retract the movable cores 44 while the mold 8 is being filled. While we have shown the cores 44 to be entirely removed from the mold 8, it is to be understood that they may be only partially withdrawn, if desired.

Where a plurality of movable cores 44 are employed, a stationary core 48 is interposed between the movable cores to prevent bridging of the material between the movable cores as they are moved into the material in the mold. The core 48 is supported by an arm 49 extending upwardly from the machine frame through frame 36.

If a single opening is desired in the finished block, it is to be understood that the stationary core may be eliminated and a single movable core utilized. In either case, the adhesion between the walls of the mold, the stationary core and the material is utilized to prevent non-uniform distribution of the material when the core or cores 44 are moved into their ultimate material shaping positions.

For further holding the material in the mold 8 in a compact state during the piercing operation of the cores 44, a hollow ram 50 is passed through the feed box 5 and engages the material in the mold 8. To permit the escape of the material confined between the ends of the cores 44 and the ram 50 into the hollow ram, it is provided with knock-out blocks 51 in its lower face. The escaped or excess material stored in the ram 50 is discharged into the feed box 5 when the ram is withdrawn. For discharging the confined material, the knockout blocks 51 are provided with plungers 52 that strike a collar 54, when the ram is retracted, as hereinafter more fully described.

The cores 44 and the pallet supporting frame 36 are actuated by a pair of co-axial cylinders operating in two stages. During the first stage of movement, the cores 44 are advanced by a piston 56 reciprocating in a combined piston and cylinder 57. In the second or tamping stage of movement, the pallet supporting frame 36 is advanced by the member 57 operating as a piston having its lower face 58 exposed to the pressure in a cylinder 59 in which it reciprocates. The movement of the pallet 37 by its supporting frame 36 presses the material in the mold 8 tightly about the cores 44 and distributes it uniformly throughout the mold. The movement of the pallet supporting frame 36 is effected by the collar 47 which engages a shoulder 60 on the piston 57.

An increase in the pressure exerted by the ram 50 during the stages of movement of the cores 44 is obtained by providing two pressure surfaces on its supporting piston 62. Referring to Figures 2 and 20, for the first stage of movement, the piston 62 is provided with an inner bore 63. Fluid is introduced in the bore 63 through a nozzle 64 that extends throughout a considerable portion of the length of the piston. The nozzle 64 is provided with a fluid passage 65 extending longitudinally thereof and a lateral passageway 66 disposed near the outer end thereof. As fluid pressure is applied to the bore 63, the ram moves downwardly at a relatively high rate of speed until the passageway 66 is uncovered by the travel of the piston. After the end of the piston is uncovered, or during the second stage of movement, fluid pressure is applied both in the bore 63 and in cylinder 67 and to the end of the piston, thereby increasing the piston area exposed to fluid pressure. The increase in the exposed surface area of piston 62 increases the pressure exerted by the ram and decreases its rate of movement.

During the period that the piston 62 is moving forward under the pressure exerted in the bore 63, a condition of vacuum exists between its inner end and the cylinder 67. In order to eliminate the condition of vacuum, a valve 68 is connected to a fluid reservoir 69 for the control valve so that fluid under low pressure is drawn into the space behind the advancing piston. When fluid under high pressure is applied to the same space by uncovering the passageway 66, the valve 68 is closed. In order to release the fluid confined between the ends of the piston 62 and the cylinder 67 during the return movement of the ram 50, the valve 68 is held open. For this purpose a rod 70 extends through the reservoir 69 from the valve 68 to a supporting lever 71 engaging the lower end of the rod 70. The lever 71 is actuated by a cam 72 mounted in the reservoir 69 and connected to a lever 74. The lever 74 is actuated by engagement with a lug 75 mounted on the rotary control valve 76 so that at the proper point in the rotation of the valve 76, the pressure behind the piston 62 is released.

With the foregoing structure, the cores 44 are first moved upwardly for piercing the material in the mold 8 in opposition to a compressing force of the ram 50. Excess material in the mold 8 is forced into the ram 50. The pressure exerted by the ram and cores during this stage of the molding operation is sufficient to compact the material in the mold, but is less than the tamping pressure. After the cores 44 are nearly seated, the tamping pressure is applied by the ram 50 and by movement of the cores 44, together with the supporting pallet 37, under the combined pressure of the fluid in the cylinders 57 and 59. The increased pressure applied to the material in the mold 8 tamps the material and completes the shaping or molding operation. After the molding operation is completed, the ram 50 is withdrawn by the application of fluid pressure to the gland end of the cylinder 67. Upon the withdrawal of the ram 50, the plungers 52 engage the collar 54, thereby ejecting the excess material stored in the ram to the feed box 5. Collar 54 surrounds the ram 50 and is supported by the machine frame.

Referring to Figures 7 and 8, the material in the mold 8 may be pierced by cores 44a and 44b operating in a definite sequence. In this modification of our invention the core 44a is first moved to its ultimate position. During the movement of the core 44a, material in the mold 8 is restrained by the ram 50 and the adhesion between the material and the wall of the mold. When the core 44a is moved to the upper limit of the travel of its actuating piston 77 working in a cylinder 78, a groove 79 in the piston 77 comes into alignment with the passageways 80 extending through the walls of the cylinder 78. Upon the alignment of the groove 79 and passageways 80, fluid entrapped above the piston 81, carrying the core 44b, is released. Upon release of the fluid above the piston 81, fluid under pressure from the control valve 76 advances the core 44b to its ultimate position. During the advance of the core 44b the material in the mold adheres to the surface of the core 44a and prevents loosening or "honeycombing".

For retracting the cores 44a and 44b, a check valve 82 bypasses the passageways 80 and permits fluid under pressure from the control valve 76 to simultaneously enter the cylinders actuating both of the cores.

After the ram 50 is withdrawn from the feed box 5, the feed box is moved to the rear of the machine by the application of fluid pressure to the gland end of the cylinders 11. The tops of the molded articles are trimmed by the backward movement of the forward end of the feed box 5. The loose material in the feed box is shoved onto the sloping forward edge of the bottom 14.

Partial ejection of the molded article from the mold 8 is secured by lifting the pallet frame 36 to bring the pallet 37 on a level with the beams 20. For lifting the frame 36 fluid pressure is applied to the gland ends of the cylinders 39. The pallet and the molded object are then moved onto a shelf 83 leading to a conveyor 85 by the subsequent regulated and steady forward movement of the filled feed box 5. With the filled feed box 5 in its advanced position, the foregoing cycle of operations may be continued automatically for an indefinite period of time, dependent upon the operation of the rotary control valve 76.

Referring to Figure 15, the rotary control valve 76 is connected to the different cylinders by pipe connections leading to the head and gland ends of each cylinder. The details of the pipe connections are hereinafter discussed in detail in connection with the various valve stages.

Referring to Figure 16, the valve 76 comprises a housing 86 and a spindle 89. The housing 86 also encloses the fluid reservoir 69, and a plurality of pump units 87. The pump units 87 are driven by a crank 88. The valve spindle 89 is made hollow to provide a return passage 90, communicating with the reservoir 69 through ports in a passageway 69a, for fluid released by the valve sections shown in Figures 23 to 29, inclusive. Low pressure fluid from the passageway 90 is drawn into the pump units 87 where it is compressed and delivered to a pressure chamber 91. From the pressure chamber 91, the fluid is delivered to a groove 92 that is connected by longitudinally extending passages 94 communicating with the different cross sectional areas shown in Figures 23 to 29, inclusive. The outer end of spindle 89 is provided with roller bearings 93 to compensate for the end thrust due to the fluid under pressure in the groove 92.

Referring to Figure 18, each pump unit 87 comprises a piston working in a cylinder 95 and secured by a connecting rod 96 to the crank 88. Low pressure fluid from the passage 90 in spindle 89 is drawn from a chamber 97 surrounding one end of the spindle and communicating therewith through ports 98. A passageway 99 extends upwardly from the chamber 97 and terminates in a check valve 100 in the bottom of each cylinder 95. On the up stroke of the piston 87, fluid is drawn from the passageway 90 into the cylinder 95. On the down stroke, the check valve 100 closes and the fluid is compressed until it reaches sufficient pressure to open a check valve 101 communicating with the pressure chamber 91. Danger from excessive pressure in the pressure chamber 91 is prevented by providing a check valve 104 opening into the reservoir 69, shown in Figure 20. Check valve 104 bears against a lever 105 mounted on the machine frame. The free end of a lever 105 bears against the under surface of a weighted arm 106 carried by a shaft 107 extending outwardly from housing 86. The outer end of the shaft 107 carries a weighted lever 108, shown in Figures 1 and 21. If the lever 108 is raised by excessive pressure in the reservoir, it is latched in its upper position by a dependent latch 109 and a stationary dog 110 until manually released. Further effective operation of the control valve 76 cannot be had with the lever 108 locked in its upper position because of insufficient mechanical pressure on the valve 104 to permit the building up of fluid pressure in the chamber 91.

Continuous automatic operation of the molding machine is obtained by automatically actuating the valve 76 through the required number of stages to constitute a complete cycle for the formation and discharging of a molded block. In the present embodiment of our invention, nine valve stages are shown. However, it is to be understood that by changing the shape of the valve spindle 89 at different places along its axis, that the number of stages and operations of the machine may be varied.

The valve spindle 89 is actuated by a ratchet wheel 112 and a pawl 114, that are in turn actuated by a timing gear 115. Selective control of the automatic operation of the machine is obtained by mounting the timing gear 115 on a pivoted arm 116 for movement into and out of mesh with a gear 117, mounted on the crank 88, by manipulating a handle 118. Connection between the gear 115 and the pawl 114 is controlled by a roller 119 mounted on the gear face opposite the arm 116. The roller 119 engages a bent-up end 120 of a lever 121, to the other end of which an actuating rod 122 for the pawl 114 is connected. During each revolution of the gear 115, the end 120 of lever 121 is depressed, thereby raising the pawl 114 and turning the valve spindle 89 through one stage. Variations in the number of stages in the valve operation may also be secured by varying the number of teeth on the ratchet wheel 112.

Manual control of the valve spindle 89 is obtained by providing a marked dial 124 on the valve spindle 89 for cooperating with indices mounted on the machine frame. For manually operating the machine, the dial 124 is manually moved by a handle 125 to bring a pointer on the dial 124 opposite the successive indices 126 on the machine frame. The lug 75 for controlling the lever 74 and the valve 68 is mounted on the dial 124.

The rotary valve mechanism and the pressure pumps are driven from a fly wheel 128 mounted exteriorly of the reservoir 69. The fly wheel 128 is connected to the crank 88 by a shaft 129, and a pinion 130 meshing with a gear 131 keyed to the crank shaft 88, as shown in Figure 17. Since the various operating cylinders are actuated by fluid pressure derived from the pump units 87, the crank 88 constitutes the main actuating element of the machine. Were fluid under pressure to escape from any one of the high pressure ports in the spindle 89 and pass through an inactive port in the housing 86, one or more of the cylinders might be actuated at an improper time, with resulting damage to the machine.

For preventing leakage of fluid under pressure between the valve housing 86 and the valve spindle 89 at the pressure ports, we provide a fluid seal shown in Figure 22. Each port 132 in the spindle 89 that communicates with a pressure passageway 94 is provided with a hollow block 134 of a larger diameter than the cooperating port 135 in the housing 86. Each block is biased outwardly into engagement with the inner surface of the housing 86 by a coil spring 136. A set screw 137 extends into a slot 138 in the outer surface of block 134 for retaining the block in the spindle 89 when the latter is entirely withdrawn from the housing 86. With this construction each block 134 is biased into a tight engagement with the inner surface of the housing 86, thereby preventing leakage of fluid under pressure between the spindle 89 and the housing 86, should a loose fit exist between the valve spindle and housing.

To further describe the operation of the molding machine, the functions of each of the valve sections BB, CC, DD, EE, FF, GG, KK, in each of the valve stages will be described. In Figure 15 each valve section is represented by a circle bearing the corresponding notation. The pipes are shown connected to the circles at positions corresponding to their angular positions about the casing. The positions of the original top port on the rotor at each valve stage is indicated by numbers 1 to 9, inclusive. The ports on each circle are numbered with a letter designating the valve section and a numeral indicating the port number. The numbers run successively in a counter clockwise direction about the valve faces beginning with the uppermost port in Figures 30 to 38, inclusive, and clockwise on the diagrammatical circles of Figure 15.

For simplicity, each valve section is referred to as a single letter, corresponding to the cross sectional notation appearing on Figure 16.

*Valve stage No. 1*

In the first valve position, shown in Figure 30, the feed box 5 and bottom 14 are advanced slightly beyond the mold 8 for placing a pallet in position on the raised pallet supporting frame 36. The valve B connects the head ends of the cylinders 11 through port B1 and a pipe 140 with fluid under pressure. For advancing the feed box 5, the gland ends of the cylinders 11 are released through port B4 and a pipe 141. Valve C relieves the pressure from beneath the piston 57 in the cylinder 59 through port C1 and a pipe 142. Valve E releases the pressure confined within the piston 57 while acting as a cylinder through port E1 and a pipe 144. Valve F connects the gland end of the cylinder 16 to the pressure chamber 94 through port F2 and the pipes 140, 145 and 146, thereby moving the feed box bottom 14 and the pallet 37 forward simultaneously with the forward movement of the feed box 5.

The head end of cylinder 16 is connected through a port B3 and a pipe 147 to the discharge chamber 90 in the valve rotor. The cylinders 39 are held in their raised positions, thereby holding the pallet support 36 in its raised position by the closure of the port B5 and the fluid pressure in the pipe 148.

The gland end of the cylinder 59 is connected through a pipe 149 with the port D1 which is closed by the valve rotor, thereby locking the piston 57 in its lower position. The gland end of cylinder 59 is connected by a flexible pipe 150 with the port G1 which is also closed by the valve rotor. Accordingly, the cores 44 are free to withdraw under the influence of gravity into their lower positions, thereby removing any obstruction to the lowering of the pallet frame during a subsequent valve operation.

The ram 50 is held in its raised position by fluid in a pipe 151 connected to the gland end of cylinder 67. The head end of cylinder 67 is connected by a pipe 152 to the ports F1 and F3, both of which are closed by the valve rotor. A check valve 154 is placed between the pipe 152 and the port F3 for a purpose hereinafter more fully set forth.

The head ends of the cylinders 39 are connected by a pipe 155 with the port C3 which is closed by the valve rotor in the first stage of operation. Accordingly, the head ends of the cylinders 39 and 67 are locked against movement while the ram 50 and the pallet frame 36 are locked in their raised positions against the force of gravity.

As the forward movement of the feed box 5 also discharges the previously formed block from the machine, the efficiency of the machine is materially increased by eliminating irregularities in the forward movement of the feed box and by controlling the speed of movement. Irregularities in movement impart a series of blows to the finished blocks which are apt to break them. Such irregularities are caused by the pulsation of the pumps 87, liquid hammers caused by the sudden closing of valves, and the like.

To eliminate such irregularities, we provide a pressure regulator or shock absorber 160 connected between the pressure reservoir 91 and the groove 92. The pressure regulator comprises a cylinder 161 in which a piston 162 is moved by the fluid under pressure outwardly against a spring 164. The gland end of the cylinder 161 is connected to the source of fluid under pressure by a pipe 165. The head end of the cylinder 161 is connected by a pipe 166 to the low pressure reservoir 69 for increasing the sensitivity of the shock absorber.

For regulating the speed of movement of the feed box 5, the pipe 140 is provided with a hand valve 167 by-passed by a check valve 168. The check valve 168 prevents the passage of fluid therethrough in a direction to advance the feed box 5. Accordingly, forward movement of the feed box 5 is controlled by the setting of the valve 167. Upon reverse movement of the feed box, the check valve 168 permits a rapid movement of fluid.

Valve stage No. 2

In the second valve stage shown in Figure 31, the pallet support 36, a pallet 37 and the cores 44 are lowered. The pallet support 36 is lowered by the release of pressure from the gland ends of the cylinders 39 by the opening of port B5, and by the application of fluid under pressure to the head ends of the cylinders 39 from the port B2.

The gland ends of cylinders 11 remain open at the port B4. The head ends of the cylinders 11 and the gland end of cylinder 16 remain under pressure from the port F2. The head end of cylinder 16 remains open at port B3. Accordingly, the feed box 5 and the pallet 37 are further advanced to their ultimate positions.

The head end of the cylinder 67 for ram 50 is open through the port F3, while the gland end of the cylinder 67 remains locked at the port K1 by the valve rotor. The piston 57 is locked in its lower position by the application of pressure at the port D1. The head end of the cylinder 59 is released at the port C1. The head end of cylinder 57 is open to release at the port E1, while the gland end is forced downwardly by the application of fluid under pressure to the pipe 150 at the port G1, thereby completely lowering the cores 44.

Valve stage No. 3

During valve stage 3, shown in Figure 32, the bottom of the feed box 5 is withdrawn and retracts the feed box 5 for a distance depending upon the setting of the saddle 17 on the tail 22, and the period of engagement of the lugs 26 and 27. The movable cores 44 are held in their lower position. To move the bottom 14 back, and with it the box 5 for a short distance, the head end of cylinder 16 is connected at the port B3 with fluid under pressure.

The gland end of cylinder 16 and the head ends of cylinders 11 are opened to release at the port F2 in order to permit the backward movement of the feed box 5 during the period when it is attached to the bottom 14. The gland ends of the cylinders 11 are open at the port B4.

The pistons of the lifting cylinders 39 are forced downwardly by the application of fluid under pressure to the pipe line 155 at the port C3, the port B2 having previously been closed by the valve rotor. The gland ends of cylinders 39 are open to release at the port B5. Accordingly, the pallet support 36 is moved to its lower position.

The ram 50 remains in its upper position by the continued closure of the port K1 connected to the gland end of cylinder 67 while the port F1, connected to the head end of the cylinder, is open. The piston 57 is held in its lower position by the locking of the port D1 by the valve rotor. The head end of cylinder 59 is open at the ports C1 and C2. Accordingly, the piston 57 is locked in its lower position. The head end of the cylinder 57 is open to exhaust at the port E1, while the gland end is connected to the source of pressure at the port G1. Accordingly, the cores 44 are forcibly held downward during this valve stage.

At the end of valve stage 3 the pallet 37 is in position at the bottom of the mold and the cores 44 are in their lower positions while the bottom 14 of the feed box 5 is withdrawn so that the material enters the substantially unobstructed mold from the feed box.

Valve stage No. 4

During valve stage 4, shown in Figure 33, the ram 50 is lowered into engagement with the material in the mold 8 and the cores 44 are moved upwardly by fluid for piercing the material in the mold 8. During this part of the operation, the cylinder 57 remains stationary.

For raising the cores 44, fluid under pressure is admitted to the head end of cylinder 57 through the port E1, while the gland end of the cylinder is connected by pipe 150 to exhaust at the port G1.

Cylinder 57 is prevented from moving upwardly by the application of fluid under pressure to the gland end of cylinder 59 at the port D1. The head end of cylinder 59 is open to exhaust at the port C2. Accordingly, the cores 44 are moved upwardly as the cylinder 57 is held in its lower position. The upward movement of cores 44 pierces the material in the mold 8. As the piston 57 is held downwardly, movement of the pallet 37 during the first part of the piercing movement of the cores 44 is prevented.

The ram 50 is moved downwardly into engagement with the material in the mold 8 by the application of fluid under pressure to the head end of cylinder 67 at the port F3. The gland end of cylinder 67 is open to exhaust at the port K1, thereby permitting fluid to escape from between the outer portion of the piston and the walls of the cylinder as the ram 50 moves downwardly. When the port 66 is uncovered by movement of the piston 62, the area of the piston 62 exposed to fluid pressure is increased, thereby increasing the force applied to the material in the mold 8 by the ram 50.

The head ends of the cylinders 39 are open at port B2, and the gland ends are open at port B5. The cylinders 11 are in a free position with their head ends open at port B1. The gland ends are open at port B4. The head end of cylinder 16 is locked at port B3 and the gland end is open at port B1.

*Valve stage No. 5*

During valve stage 5, shown in Figure 34, the ram 50 continues to exert its maximum pressure on the material in the mold while the cores 44 are moved upwardly as far as possible with the piston 57 held in its lower position. The pallet support 36 is free to move. The feed box 5 and the bottom 14 remain stationary.

The excess material in the mold 8 moves through the knockout blocks 51 to the interior of the ram 40. The ram 50 is held in its lower position by the continued application of fluid under pressure at both ports F1 and F3. The gland end of cylinder 67 remains open at port K1.

Fluid under pressure is supplied to the head end of cylinder 57 through the port E1 while the gland end is open at port G1. The gland end of the cylinder 59 is maintained under pressure at the port D1. The head ends of cylinders 11 and the gland end of cylinder 16 are released at the port B1. The head end of cylinder 16 is released at the port B3. The lifting cylinders 39 are released at their head ends by the port B2.

*Valve stage No. 6*

During valve stage 6, shown in Figure 35, the cylinder 57 is moved as a piston to raise the pallet supporting frame 36, and the cores 44 are pressed to their final molding position. The upward movement of the piston 57 causes the collar 47 to engage the lugs 46 and press the pallet 37 against the material in the mold. The movement of the pallet 37 within the mold 8 assures a complete filling of the spaces surrounding the cores, and a uniform size in the molded objects.

The ram 50 is held in its downward position by the application of fluid under pressure through port F1. At this time port F3 is opposite an exhaust passageway, and check valve 154 becomes effective to prevent the passage of fluid from the port F1 back into the port F3. Fluid under pressure is applied to the head end of cylinder 57 from the port E1. Pressure is also applied to the head end of cylinder 59 at port C1, thereby raising the piston 57. As the piston 57 moves upwardly, the cores 44 are further advanced. The upward movement of the cylinder 57 causes the lifting of the pallet support 36 against the ram 50. During this movement the gland end of cylinder 59 is released at port D1.

The head ends of cylinders 11 and the gland end of cylinder 16 are under release at the port B1. The head end of cylinder 16 is under release at port B3. The head ends of cylinders 39 are under release at port B2, and the gland ends are under release at port B5.

*Valve stage No. 7*

During valve stage 7, shown in Figure 36, both of the cylinders controlling the cores 44 remain under pressure. Pressure is removed from the head end of cylinder 67 and applied to the gland end for raising the ram 50 out of engagement with the material in the mold 8. For lifting the ram 50, the head end of cylinder 67 is connected to the port F1 at exhaust. The gland end of cylinder 67 is connected to the port K1 under pressure, to raise the ram.

The head end of cylinder 57 remains under pressure from the port E1, while the head end of cylinder 59 remains under pressure from port C2. The gland end of cylinder 59 is open at D1, and the gland end of cylinder 57 is out of connection with the pipe 150.

The head ends of cylinders 11 are on release at port B1. The gland ends of cylinders 11 are under release at the port B4. The head and gland ends of the cylinders 39 are open at ports B2 and B5, respectively.

*Valve stage No. 8*

During valve stage 8, shown in Figure 37, the feed box 5 is retracted, carrying with it the excess material dropped from the ram 50 and such material as is trimmed off from the molded object by the forward edge of the box. At the end of the backward stroke, the feed box 5 is latched to the bottom 14 by the engagement between the lugs 26 and 27. The ram 50 is locked in its upper position against the force of gravity. The cores 44 and the pallet support 36 are held in their raised position.

The ram 50 is locked in its upper position by the closing of the port K1 connected to the gland end of cylinder 67. The head end of cylinder 67 is locked by the valve rotor at valve section F. To move the feed box 5 to the rear, pressure is applied to the gland ends of the cylinders 11 at the port B4. The head ends of the cylinders are opened at port B1. At the same time, the head end of cylinder 16 is open at port B3, and the gland end is also open at the port B1.

The cores 44 and the frame 36 are held in their upper position by the locking of port E1 by the valve rotor, and the locking of ports C1 and C2, respectively. The lifting cylinders 39 remain free by having the head ends open at the port C3, and the gland ends open at the port B5, respectively.

*Intermediate action of valve K*

Between valve stages 8 and 9, the valve K establishes communication between the gland end of cylinder 59 and the pressure chamber in advance of the completion of the other valve settings of stage 9. This movement loosens the cores 44 in the molded object in advance of lifting the molded object out of the mold 8, which is accomplished in stage 9. The initial withdrawing movement of the cores 44 is accomplished by applying fluid under pressure at the port K2 through a pipe 160, connected to pipe 149. At the same time, the head end of cylinder 59 is opened at the port C1.

*Valve stage No. 9*

During valve stage 9, shown in Figure 38, the pallet support 36 is raised for stripping the molded object from the cores 44 and 48. The cores are retracted by the downward movement of the piston 57 during this valve stage. At the close of valve stage 9, the molded object is substantially at the level of the bottom of the feed box 5, later to be shoved out of the machine onto any suitable conveyor. Upon the advance of the filled box 5, preparatory to a subsequent molding operation, the pallet supporting frame 36 is not lowered until a pallet has been placed thereon by the movement of the bottom 14 of the feed box 5.

The cylinders 39 are supplied with fluid under pressure at their gland ends from port B5, while their head ends are open to exhaust at port B2. The ram 50 remains in its raised position by the locking of the gland end of the cylinder 67 at the port K1.

Pressure is applied to the gland end of cylinder 59 from the port K2 to move the piston 57 to its lower position in the cylinder 59. At the completion of its downward movement, the port G1 is locked by the valve rotor, and, accordingly, no pressure is applied to the gland end of cylinder 57. The head end of cylinder 57 is also locked by valve E. Accordingly, the downward movement of the cores 44 is limited to the movement of the piston 57. The feed box 5 is held in its retracted position by the locking of the gland ends of cylinders 11 at the port B4 by the valve rotor. The head ends of the cylinders 11 are under release at port B1.

The molded article is stripped from the mold 8 by supplying fluid under pressure to the gland ends of the cylinders 39 at the port B5. The actuation of the gland end of cylinders 39 raises the pallet support 36 to strip the molded article from the mold 8 and bring it to the level of the top of the mold, from which position it can be pushed by the succeeding forward movement of the feed box 5.

The foregoing cycle of operations may continue indefinitely by replenishing the supply of molding material to the chute 2, and pallets to the hopper 32. The operations will continue automatically so long as the pressure in the pressure chamber 91 remains below a value sufficient to open valve 104, and so long as the timing gear 115 is in mesh with the gear 117. When the gear 115 is out of mesh with the gear 117, the operations may be carried on manually by shifting the valve from stage to stage by manipulation of handle 125.

While we have shown and described the preferred form of our invention, it is to be understood that certain changes may be made therein without departing from the spirit of the invention. For example; while we have illustrated fluid pressure cylinders for operating the moving parts of the machine, it is to be understood that solenoids may be substituted for the fluid operating cylinders, and an electrical control therefor substituted for the control valve 76 without departing from the invention.

While we have illustrated and described the present preferred embodiment of our invention, it is to be understood that it may be otherwise embodied and practiced within the scope of the following claims.

We claim:

1. In combination, a mold, a relatively movable core for piercing material in the mold, means for creating relative movement between the core and mold in a plurality of steps, a relatively movable support within the mold, and means for creating relative movement between the support and the mold during one of the relative movements between the core and mold.

2. In combination, a mold, a core movable relative to the mold, a piston for actuating the core, a movable bottom for the mold having an opening for the reception of the core, means for actuating the bottom comprising a second piston surrounding the first named piston and forming a cylinder therefor, and a cylinder for housing the second named piston.

3. In combination, a mold, a core movable relative to the mold, a piston for actuating the core, a movable bottom for the mold having an opening for the reception of the core, means for actuating the bottom comprising a second piston surrounding the first named piston and forming a cylinder therefor, and means for separately supplying fluid under pressure to the pistons.

4. In combination, a mold, a core movable relative to the mold, a piston for actuating the core, a movable bottom for the mold having an opening for the reception of the core, means for actuating the bottom comprising a second piston surrounding the first named piston and forming a cylinder therefor, and means for separately supplying fluid under pressure to the pistons, whereby the core is actuated to pierce material in the mold and thereafter the bottom is actuated to compress material in the mold and to permit a further movement of the core.

5. In a molding machine, a cylinder, a hollow piston having a secondary pressure surface movable therein, means normally projecting into the piston and having a passage for transmitting fluid under pressure to a face of the piston and lateral passages normally closed by the inner walls of the cylinder, whereby the piston exposes an increased area to fluid pressure upon movement of the piston to uncover one or more of said lateral passages.

6. In a molding machine, a pressure pump, a valve for distributing fluid compressed by the pump, actuating means for the valve comprising a gear train, and means for selectively engaging and disengaging the gear train with the pump.

7. The combination with a mold, of a plurality of core members movable relative to the mold for piercing material therein, and means for creating relative movement between the mold and the several core members in sequence.

8. In combination, a mold, a plurality of cores insertable into the mold for piercing material therein, and means for actuating the cores in sequence, comprising a cylinder having a port that is uncovered during the movement of one of the cores.

9. In a molding machine, a mold, a relatively movable core, means for supplying material to the mold, and means for at least partially separating the core from the mold while material is being supplied to the mold.

10. In a molding machine, a mold, means for supplying material thereto, a core for piercing material within the mold, and means for creating relative movement between the mold and core whereby the core is at least partially withdrawn from the mold while the latter is receiving material.

11. In a molding machine, a mold, a relatively movable hopper for supplying material thereto, a core for piercing material in the mold, and means for creating relative movement between the mold and the core whereby the core is removed from its ultimate material-shaping position relative to the mold while material is being supplied to the mold from the hopper.

12. In a molding machine, a mold, pallet-placing means cooperating therewith, a core movable relatively to the mold and a pallet disposed therein, means for supplying material to the mold with the pallet in place, and means for creating relative movement between the mold and core whereby the core is moved relatively to the mold while the mold is being supplied with material for evenly distributing the material throughout the mold.

13. In a molding machine, a mold, a core having relative movement therewith, means for at least partially withdrawing the core from the mold while the mold is being filled with molding material, and for causing the core to pierce the material in the mold after the mold is filled.

14. In a method of operating a molding machine, the steps consisting in securing uniform distribution of material in the mold by withdrawing a core from the mold while the material is placed in the mold, and pressing the core into position in the material.

15. In a method of operating a molding machine, the steps consisting in securing uniform distribution of material in the mold by withdrawing a core from the mold while material is placed in the mold, pressing the core into position in the material, and then applying a molding pressure to the mold.

16. In a method of operating a molding machine, the steps consisting in placing a pallet in mold, filling the mold with molding material, pushing a core into the molding material, moving the pallet during the latter part of the movement of the core, and applying molding pressure to the material in the mold during the movement of the core and pallet.

17. In a method of operating a molding machine, the steps consisting in filling a substantially unobstructed mold with molding material, successively inserting a plurality of cores into the material, and applying a molding pressure to the material after the cores are in position.

18. In a molding machine, the combination with a mold, means for supplying molding material thereto, and a core for piercing the material in the mold, of a piston and cylinder for driving the core into the mold and a second piston and cylinder for applying an increased pressure to said core.

19. In a molding machine, the combination with a mold, material-charging means therefor, and a core for piercing the material in the mold, of means for driving the core into the mold, means for applying increased pressure to the core, a ram for compacting the molded material and means for increasing the pressure exerted by said ram near the end of its stroke.

20. In a molding machine, the combination with a mold, means for supplying molding material thereto, and a core for piercing the material in the mold, of a piston and cylinder for driving the core into the mold and a second piston and cylinder for applying an increased pressure to said core and a pallet carrier movable within said mold, actuated by said second piston.

21. In a molding machine, a mold, a core for piercing material within the mold, and means for creating relative movement between the core and mold comprising a plurality of independent pistons operable by fluid pressure at different times for effecting different pressures on material within the mold.

KARL ERIK WILHELM JAGDMANN.
OSCAR HENRY BONTER.